3,248,353
ALKYLENE POLYAMINE RESIN
Anthony Thomas Coscia, South Norwalk, Conn., assignor to American Cyanamid Company, Stamford, Conn., a corporation of Maine
No Drawing. Filed May 17, 1963, Ser. No. 281,320
20 Claims. (Cl. 260—29.2)

The present invention relates to a water-soluble cationic cellulose-substantive chemo-stable polymer of cross-linked long chain configuration useful as a retention aid in the manufacture of paper, and to emulsions having a content thereof. The invention includes the manufacture of the polymer and the deposition of dispersed solids by the aid of the polymer.

U.S. Patent No. 2,926,154, issued on February 23, 1960, to G. I. Keim discloses a water-soluble cationic polymer prepared by condensing adipic acid with diethylenetriamine to form a substantially linear water-soluble cationic polyamidepolyamine, and then reacting this polyamine wih epichlorohydrin so as to convert the polyamine to cross-linked higher molecular weight, thermosetting state. The product acts as an efficient retention aid in the manufacture of paper, but is unstable when stored as an aqueous solution at a solids content in excess of about 30%.

U.S. Patent No. 2,969,302, issued on January 24, 1961, to J. Green discloses a water-soluble cationic retention aid prepared by one-step reaction of a polyalkylenepolyamine with epichlorohydrin. The resulting polymer is therefore highly branched so that its coverage is comparatively low.

The discovery has now been made that an efficient water-soluble cationic retention aid which does not gel when stored for comparatively long periods of time can be made by reacting epichlorohydrin with two different amines in such proportions as to form substantially linear polyalkylenepolyamine chains which are cross-linked with epichlorohydrin to higher molecular weight state but which are not thermosetting.

One of the amines is a water-soluble bifunctional amine and is present in sufficient amount to act as chain-forming component.

The other amine is a polyfunctional amine and is present in comparatively minor amount. It acts both as chain-forming component and as a component with which epichlorohydrin can react as cross-linking agent.

The epichlorohydrin is substantially completely reacted. For this reason and because the ratio of the functionality of the epichlorohydrin to the total functionality of the amines is about 1:1, the final polymer contains substantially no primary amino groups, secondary amino groups and quaternary ammonium groups, and is chemo-stable.

The polymer of the present invention is advantageously prepared by slowly adding the epichlorohydrin with stirring into a mixture of the bifunctional polyfunctional amines so as to ensure a uniform reaction between the epichlorohydrin and the amines. The reaction is exothermic so that it is advantageous to employ cooling, at least while the epichlorohydrin is reacting most vigorously. The reaction may be completed at an elevated temperature. Moreover, it is advantageous to react the amines in water solution as water is effective in moderating the reaction. Suitable amounts of water are 20%–60% of the weight of the reaction mixture or if desired, an organic medium such as dimethyl formamide can be used.

The reaction converts substantially all the chlorine of the epichlorohydrin to hydrogen chloride, which tends to inhibit the reaction. It is advantageous to employ an acid acceptor so as to prevent the reaction from proceeding unduly slowly during its final phase. The alkali metal alkalis are suitable for the purpose.

The structure of the polymer has not been ascertained, but the polymer essentially consists of substantially linear alkyleneamine chains cross-linked as comparatively infrequent intervals with epichlorohydrin.

As bifunctional amines there may be employed any water-soluble amine having two reactive amine hydrogen atoms. Methylamine, ethylamine, ethanolamine, propylamine, N,N'-dimethylethylenediamine, piperazine and aniline are suitable. The amines need not possess great water-solubility, and the suitability of any particular amine as a raw material can be readily determined by laboratory trial. Mixtures of two or more bifunctional amines may be used.

As polyfunctional amines there may be employed any water-soluble amine containing 3 or more reactive amino hydrogen atoms. These amines consequently have a functionality greater than 2, and include amines such as ethylenediamine, N-methylethylenediamine, the polyalkylenepolyamines including diethylenetriamine, tetraethylenepentamine and the corresponding polypropylenepolyamines, p-phenylenediamine, p,p'-bisaniline, and 1,3-diamino-2-propanol.

The present invention is of particular interest when a monoamine for example methylamine is selected as the bifunctional amine. The present invention permits this material to be used as principal amine component in the manufacture of a water-soluble yet cross-linked cationic resin.

The functionality of the amines used in the present invention is equal to the number of reactive amino hydrogens therein, that is, to the number of hydrogens which are attached to basic amino nitrogen atoms. Thus ethylenediamine has a functionality of 4, tetraethylenepentamine has a functionality of 7, and ammonia has a functionality of 3. Epichlorohydrin has a functionality of 2.

The epichlorohydrin and the amines may be employed in partially prereacted form. Thus, for example

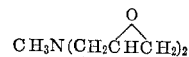

may be employed in place of one mol of methylamine and two mols of epichlorohydrin, and

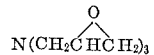

may be employed in place of ammonia and three mols of epichlorohydrin.

In the reaction which results in formation of the polymer, the bifunctional amine acts substantially exclusively as chain-forming components.

The polyfunctional amine acts both as chain-forming component and as component which provides sites from which cross-linking can take place when all of the epichlorohydrin has reacted, and the number of such sites varies with functionality of the polyfunctional amine. Thus, when the polyfunctional amine is N-methylethylenediamine which has a functionality of 3, two functionalities are consumed in the chain-forming reaction and only one functionality remains which provides a site with which the epichlorohydrin can react as cross-linking agent. On the other hand, when the polyfunctional amine is tetraethylenepentamine which has a functionality of 7, five sites for cross-linking are provided by each molecule of the teraethylenepentamine on becoming part of the chain.

A large number of adjacent cross-linking sites (such as are contributed by tetraethylenepentamine) are not preferred, and we have found that very satisfactory results are obtained instead by use of ammonia as the polyfunctional amine. When for example a water-soluble primary amine is employed as the chain-forming component and ammonia is employed as the polyfunctional amine which provides sites with which epichlorohydrin can cross-link, the molar ratio of the primary amine to the ammonia may be between about 50:1 and 2:1, which provides between 2 and 50 nitrogen atoms which do not cross-link for every one which does. A preferred ratio is 5:1.

The reaction proceeds in the temperature range of 0° C.–100° C. but is most conveniently performed in the temperature range of 30° C. to 70° C. The appearance of unreacted amine in the product shows either that insufficient epichlorohydrin was added or that part of the epichlorohydrin which was added underwent hydrolysis and therefore did not react. A small excess of epichlorohydrin may be added and is tolerated by the reaction.

The polymers of the present invention are effective as retention aids in the manufacture of paper in that when added to aqueous suspensions of cellulose paper making fibers they cause ultra-small particles of materials suspended therein to be deposited on the fibers. Among the ultra-small particles which are deposited in this way are pigments (for example, clay, calcium carbonate, ultramarine and titanium dioxide), rosin size, emulsion particles, and the cellulose "fines" normally present in paper making suspensions. In general, the polymers are added as dilute (e.g. 1%) aqueous solutions to the fibrous suspension when the zone of intensive agitation has passed. Thus the polymer solution may advantageously be added at the fan pump. A suitable amount is readily found by trial, and in most instances between 1 ounce and 1 lb. of polymer per ton of fibers (dry basis) causes very satisfactory retention of the particles without producing wet strength.

The polymers find particular use for the preparation of cationic emulsions intended for paper making use. They are generally best employed in conjunction with a non-ionic or weakly anionic emulsifying agent. The amounts of each which are used are such that the resulting emulsion is stable and is self-substantive to cellulose fibers in aqueous suspension.

Paper sizes which can be emulsified and applied to cellulose fibers in this way include the higher fatty acid isocyanates, the higher fatty acid ketene dimers and the higher fatty acid anhydrides and petrolatum and wax. Impregnating agents which can be emulsified and applied to cellulose fibers in this way include asphalt and petroleum tar. The resulting emulsions, being cationic and cellulose-substantive, are likewise added to cellulose pulp at the fan pump.

The invention will be more particularly illustrated by the examples which follow. These examples constitute specific embodiments of the invention and are not to be construed as limitations thereon.

*Example 1*

The following illustrates a readily-prepared, stable, highly effective polymer of the present invention.

Into a 1-liter, three-necked flask fitted with a stirrer, condenser, thermometer, and dropping funnel are placed 93 g. (1.2 mols) of 40% aqueous (commercial) methylamine, 12 g. (0.2 mol) of ethylenediamine and 80 ml. of water. 148 g. (1.6 mols) of epichlorohydrin is added dropwise over 90 minutes with cooling at 43°–47° C.

The solution is heated for two hours at 63°–67° C., after which 24 g. of sodium hydroxide in 100 ml. of water is added dropwise over 90–120 minutes with the solution at that temperature.

The solution is maintained at 55°–65° C. until its viscosity at that temperature is equal to the viscosity of the Gardner-Holdt L standard liquid at that temperature. At this point the epichlorohydrin has substantially completely reacted and the polymer is short of its gel point. The resin solution is neutralized with glacial acetic acid to a pH of 4.5 and cooled to room temperature. The solids content of the solution (determined by evaporating a sample to dryness at 120° C.) is 45% by weight.

The polymer solution is stable for many months at room temperature.

In this example, the ratio of the total functionality of the epichlorohydrin (which is bifunctional) to the methylamine (which is difunctional) and the ethylenediamine (which is tetrafunctional) is 3.2:(2.4+0.8). The two amines and the epichlorohydrin are thus reacted in functional equivalence. The molar ratio of the methylamine to the ethylenediamine is 6:1.

The resin has the theoretical structure:

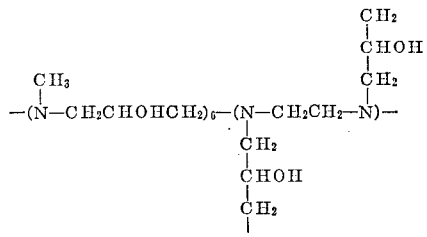

*Example 2*

The procedure of Example 1 is repeated except that 16.5 g. (0.16 mol) of diethylenetriamine is used instead of the ethylenediamine, and the solution is heated at 63°–67° C. until its viscosity is 0 (as determined in Example 1) about 3 hours being required.

A similar solution is obtained, which is of equal stability.

*Example 3*

To a jacketed kettle equipped with stirrer is added 167 liters of water, 5.3 kg. (68 mols) of 40% aqueous monomethylamine solution and 3.4 kg. (33 mols) of diethylene triamine. The kettle is closed and cooling water is supplied to the jacket.

A total of 14.3 kg. (155 mols) of epichlorohydrin is then pumped into the kettle over a period of 100 minutes.

The flow of cooling water is regulated to limit the temperature rise to 72° C. After two hours at about 65° C. there is added 3.1 kg. of sodium hydroxide in 8 lb. of water with cooling. The resulting solution is heated at 55° C. to a viscosity of G (as determined by the method of Example 1). The solution is adjusted to pH 4 by addition of glacial acetic acid and is cooled, and is similar to the products of Examples 1 and 2.

*Example 4*

The procedure of Example 1 is repeated except that 73 g. (1.2 mols) of ethanolamine is used in place of the methylamine of Example 1 and the amount of sodium hydroxide is increased to 30 g. The viscosity of the final solution (determined as in Example 1) is P. A similar resin is obtained.

*Example 5*

The following illustrates the effectiveness of guanidine as polyfunctional amine.

Into a three-necked, round-bottomed flask fitted with a condenser, stirrer, dropping funnel and thermometer is placed 77.5 g. of 40% methylamine (1 mol), and 10.7 g. (1.1 mols) of epichlorohydrin is added dropwise over 90 minutes at 40–45° C. with cooling. The solution is heated at 63°–67° C. for ½ hour, after which 40 g. (1 mol) of sodium hydroxide in 60 ml. of water is added dropwise over a 5–10 minute period at 60–65° C. with cooling.

The solution is heated for ½ hour at 63°–67° C. and 74 ml. of water is added to decrease the solids content of the solution by 10%. The solution is maintained for 1½ hours more at the same temperature until the Gardner-Holdt viscosity is C–E.

11.8 g. of guanidine in hot aqueous solution is added dropwise over 5–10 minutes.

The solution is diluted with an equal weight of water. 22 g. (0.24 mol) of epichlorohydrin is added and the solution is heated at 53°–57° C. for 1 to 2 hours until the Gardner-Holdt viscosity reaches H–I, as determined by the method of Example 1. The solution is acidified with HCl to a pH of 4.5 and is diluted to 10% solids with water and cooled to room temperature.

*Example 6*

The following illustrates the utility of the polymers of the present application as retention aids for pigments in the manufacture of paper.

To an aqueous suspension of papermaking cellulose fibers at a consistency of 0.6% and a pH of 6.5 is added with gentle stirring 10% (based on the dry weight of the fibers) of titanium dioxide pigment (papermakers' grade), followed by 0.05% (based on the dry weight of the fibers) of the polymer of Example 1, as a 0.1% by weight solution in water. The suspension is formed into handsheets in standard laboratory manner. The addition of the polymer increases the proportion of pigment retained by the fibers.

*Example 7*

The following illustrates the preparation of a methylamine-iminobispropylamine-epichlorohydrin polymer of the present invention.

Into a three-necked, 1-liter round-bottomed flask fitted with a dropping funnel, thermometer, condenser and stirrer are placed 93 g. (1.2 mols) of 40% aqueous methylamine, 21.0 g. (0.16 mol) of 3,3′-iminobispropylamine and 80 ml. of water. 148 g. (1.6 mols) of epichlorohydrin is added dropwise with cooling at 43°–47° C. over 90-minutes. The reaction is heated for two hours at 63°–67° C. 24 g. (0.6 mol) of sodium hydroxide in 100 ml. of water are added dropwise over a one-hour period at 63°–67° C.

The solution is heated at 63°–67° C. until the Gardner-Holdt viscosity reaches N–P (determined as in Example 1), about three hours being required. The pH is adjusted to 4–5 by the addition of glacial acetic acid and the solution is cooled.

*Example 8*

To one mol (103 g.) of diethylenetriamine in 160 cc. of water at 40° C. is added 4 mols (370 g.) of epichlorohydrin dropwise over 1½ hours. Aniline (2 mols, 186 g.) is then added dropwise over 1 hour. Finally 80 g. (2 mols) of sodium hydroxide as a 40% aqueous solution is added dropwise. The resinous mixture is then heated at 50° C. until the Gardner-Holdt viscosity is in the range of H–P (as determined in Example 1) at 30% solids. This corresponds to substantially complete reaction.

The resulting resin acts as anchoring agent for hydrophobic topcoat material when applied to non-fibrous regenerated cellulose film.

*Example 9*

The following illustrates the preparation of a polymer according to the present invention wherein ammonia is the polyfunctional amine.

To 31 g. (1 mol) of methylamine in 40% aqueous solution is added 3.4 g. (0.2 mol) of ammonia as a 28% solution. Epichlorohydrin (120 g., 1.3 mols) is added dropwise over 90 minutes while the reaction mixture is maintained at 40°–45° C. The reaction mixture is then heated 65° C. for 2 hours. Sodium hydroxide solution (26 g. in 75 ml. of water) is then added and the resulting solution is heated at 60° C. until its Gardner-Holdt viscosity is T (about 2 hours). The product is then cooled and acidified to pH 4.5 with concentrated HCl. The solution has a solids content of 50% and is stable for at least several months at 25°C.

In this example, the total functionality of the epichlorohydrin to the methylamine and to the ammonia is 2.6:(2.0+0.6). The amines and the epichlorohydrin are thus reacted in functional equivalence. The molar ratio of the methylamine to the ammonia is 5:1.

The polymer has the theoretical structure

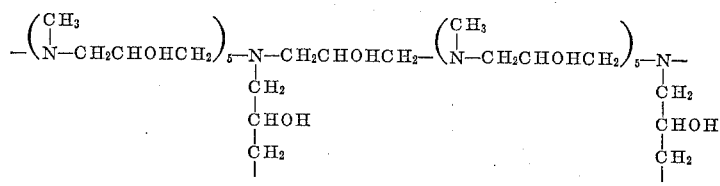

It will be seen that in this example the linear chains are cross-linked only at every sixth nitrogen atom.

*Example 10*

The following illustrates the effectiveness of the foregoing polymer as retention aid for paper sizing emulsions of cellulose-reactive sizing agents.

An emulsion is prepared by adding 5 g. of the polymer of Example 1 to 100 cc. of water at 85° C. containing 5 g. of a water-soluble cationic starch and 0.3 g. of sodium lignosulfonate, running 10 g. of molten octadecyl ketene dimer into the solution with vigorous agitation, homogenizing the resulting cationic emulsion and rapidly cooling.

The procedure is repeated with use of distearic anhydride in place of the ketene dimer.

The two procedures described above are repeated except that none of the amino polymer is used.

The emulsions are tested by forming an aqueous suspension of cellulosic, papermaking fibers at a consistency of 0.6% and a pH of 6.5, adding thereto sufficient emulsion to provide in each instance 0.2% of the sizing agent based on the dry weight of the fibers, sheeting the fibers to form paper, drying the paper at 110° F. until a high degree of sizing develops (five minutes for the stearic anhydride and 30 minutes for the ketene dimer) and determining the sizing values of the paper in standard laboratory manner using 20% aqueous lactic acid as the test fluid.

Results are as follows:

| Size | Sizing, Seconds | |
|---|---|---|
| | With polymer | Without polymer |
| Stearic anhydride | 7,000 | 100 |
| Octadecyl ketene dimer | ¹ 6,000 | ¹ 3,000 |

¹ After 30 minutes of supplementary heating at 110° F. Values after 5 minutes are 200 secs. (with resin) and 50 secs. (without resin).

*Example 11*

The following illustrates the effect of a minor excess in the amount of amines used.

The procedure of Example 9 is repeated except that the amount of ammonia is increased to 4.72 g. (0.36 mol). Substantially the same polymer is obtained.

*Example 12*

The following illustrates the effect of the polymer of the present invention as drainage aid in the manufacture of paper.

To a neutral cellulose (bleached sulfite) paper-making pulp beaten to a Greene freeness of 400 ml. is added 0.10% of the polymer of Example 9 (polymer solids based on the dry weight of the fibers). The pH of the pulp is adjusted to 6.3.

The polymer increases the amount of water recovered from the pulp in a standard laboratory freeness tester from 230 ml. to 335 ml.

The results show that the amino polymer causes a major increase in the rate in which water-laid cellulose webs release their water during drainage.

Example 13

The following illustrates the effect of the polymer of the present invention as retention aid for principal pigments used in the manufacture of paper.

An aqueous suspension of bleached sulfite fibers is beaten to paper-making consistency at a neutral pH. The consistency of the suspension is adjusted to 0.6% and an aliquot is removed containing 3 g. of fiber (dry basis). To this is added with stirring 7.0% of titanium dioxide pigment (Unitane 0-110) as a 10% suspension in water, and the pH of the pulp is adjusted to 6.9. There is then added with stirring 0.0125% (based on the dry weight of the fibers) of the polymer of Example 9 as a 0.1% aqueous solution. The suspension is sheeted to form a handsheet having a basis weight of 30 lbs. (25" x 40"/500). The titanium dioxide content of the sheet is found by ashing.

The procedure is repeated using increasing amounts of polymer and the procedure is further repeated using calcium carbonate and clay as the pigments.

The amount of calcium carbonate in the paper is found by titration using excess HCl and back titrating with sodium hydroxide. The amount of clay in the paper is found by ashing.

The results are as follows:

| | Pigment | | Pulp pH | Percent polymer added [1] | Percent pigment | |
|---|---|---|---|---|---|---|
| No. | Name | Percent Added [1] | | | In sheet [1] | Retained [2] |
| 1 | TiO$_2$ | 7.0 | 6.9 | None | 0.78 | 11.1 |
| 2 | TiO$_2$ | 7.0 | 6.9 | 0.0125 | 1.1 | 15.8 |
| 3 | TiO$_2$ | 7.0 | 6.9 | 0.025 | 2.1 | 30.0 |
| 4 | TiO$_2$ | 7.0 | 6.9 | 0.05 | 3.2 | 45.8 |
| 5 | TiO$_2$ | 7.0 | 6.9 | 0.1 | 3.3 | 47.2 |
| 6 | CaCO$_3$ | 15.0 | 8.8 | None | 1.1 | 7.3 |
| 7 | CaCO$_3$ | 15.0 | 8.8 | 0.0125 | 1.7 | 11.3 |
| 8 | CaCO$_3$ | 15.0 | 8.8 | 0.025 | 2.4 | 16.0 |
| 9 | CaCO$_3$ | 15.0 | 8.8 | 0.05 | 3.7 | 24.7 |
| 10 | CaCO$_3$ | 15.0 | 8.8 | 0.1 | 4.4 | 65.0 |
| 11 | Clay | 25.0 | 6.4 | None | 1.2 | 4.8 |
| 12 | do | 25.0 | 6.4 | 0.0125 | 3.9 | 15.6 |
| 13 | do | 25.0 | 6.4 | 0.025 | 6.1 | 24.4 |
| 14 | do | 25.0 | 6.4 | 0.05 | 7.4 | 29.6 |
| 15 | do | 25.0 | 6.4 | 0.1 | 7.6 | 30.4 |

[1] Based on dry weight of the fibers.
[2] Based on weight of pigment added.

The results show that best retention of pigment per increment of polymer added occurs in the range of about 0.02%–0.05% of polymer based on the dry weight of the fibers.

Example 14

The procedure of Example 13 is repeated except that the order in which the pigment and retention aid is added is reversed.

Similar results are obtained, but the amount of pigment which is retained in each instance by the fibers is slightly lower.

Example 15

The following illustrates the use of the polymer of the present invention in the manufacture of paper.

An aqueous suspension of beaten unbleached southern kraft papermaking fibers is adjusted to near neutrality (pH 6.2) and four aliquots are removed. One aliquot is retained as control and to this nothing is added. To the remainder are added the amounts of the polymer of Example 9 as are shown in the table below; the polymer is added as a 0.1% by weight solution in water.

The aliquots are stirred gently for a few minutes to permit the polymer to be adsorbed by the fibers, after which the aliquots are sheeted on a laboratory handsheet machine to form handsheets having a basis weight of 100 lbs. (25" x 40"/500 ream). The handsheets are dried on a laboratory rotary drum drier for 1.5 minutes at 240° F., after which their dry strength is determined. Results are as follows:

| No. | Percent Polymer [1] | Pulp pH | Dry Strength | | Wet Tensile | |
|---|---|---|---|---|---|---|
| | | | Burst [2] | Percent Incr. | Lb./In. | Percent of Dry [3] |
| 1 | None | 6.2 | 83 | | 1.0 | |
| 2 | 0.25 | 6.2 | 87 | 4.8 | 2.0 | 4.0 |
| 3 | 0.5 | 6.2 | 101.5 | 22.3 | 4.1 | 7.9 |
| 4 | 1.0 | 6.2 | 104 | 25.2 | 5.75 | 10.9 |

[1] Based on the dry weight of fibers.
[2] Lb., mullen.
[3] Percent of dry tensile strength.

The wet strength values obtained are sufficiently low to permit the paper to be pulped in an ordinary paper beater.

The results are unusual in that they were achieved by the addition of a small amount of a non-thermosetting polymer to pulp having a near neutral pH, and produced negligible wet strength, so that they can be repulped without special treatment by ordinary papermaking apparatus.

The polymer of the present invention is thus particularly advantageously used for the manufacture of paper intended for office folders, corrugated box board liners and other purposes where the paper is not apt to become wet.

I claim:

1. A process for manufacturing a water-soluble cationic cellulose-substantive chemo-stable polymer of cross-linked long chain configuration, which comprises substantially completely reacting to a point short of gelation epichlorohydrin with a major proportion of a water-soluble bifunctional amine as chain-forming component and a minor proportion of a water-soluble polyfunctional amine having a functionality greater than 2 as component forming secondary amine linkages in said chain, the ratio of the functionality of said epichlorohydrin to the total functionality of said amines being substantially 1:1.

2. A process according to claim 1 wherein the bifunctional amine is methylamine.

3. A process according to claim 1 wherein the polyfunctional amine is ammonia.

4. A process according to claim 1, wherein the polyfunctional amine is guanidine.

5. A process according to claim 1 wherein the epichlorohydrin and the amines are reacted in aqueous medium.

6. A process according to claim 1 wherein the epichlorohydrin and the amines are reacted in aqueous medium containing an acid acceptor.

7. A process according to claim 1 wherein the amines are in homogeneous admixture while said epichlorohydrin is reacting therewith.

8. A process for manufacturing a water-soluble cationic cellulose-substantive chemo-stable polymer of cross-linked, long chain configuration, which comprises substantially completely reacting epichlorohydrin with a water-soluble primary mono amine and ammonia, the ratio of the functionality of said epichlorohydrin to the total functionality of said primary mono amine and ammonia being about 1:1 and the molar ratio of said primary amine to said ammonia being between about 50:1 to 2:1.

9. A process according to claim 8 wherein the primary amine is methylamine.

10. A process according to claim 8 wherein the primary amine is aniline.

11. A process according to claim 8 wherein the molar ratio of primary amine to ammonia is about 5:1.

12. A polymer produced by a process according to claim 1.

13. An aqueous cationic emulsion of a hydrophobic organic cellulose-reactive sizing agent containing a small but effective amount as retention aid of a polymer prepared by a process according to claim 1.

14. An aqueous cationic emulsion of a hydrophobic fatty acid anhydride containing a small but effective amount as retention aid of a polymer prepared by a process according to claim 1.

15. An aqueous cationic emulsion of stearic anhydride containing a small but effective amount as retention aid of a polymer prepared by a process according to claim 1.

16. An aqueous cationic emulsion of a hydrophobic fatty acid ketene dimer containing a small but effective amount as retention aid of a polymer prepared by a process according to claim 1.

17. An aqueous cationic emulsion of octadecyl ketene dimer containing a small but effective amount as retention aid of a polymer prepared by a process according to claim 1.

18. In the manufacture of pigmented paper wherein a hydrophilic pigment is added to an aqueous suspension of cellulose paper-making fibers and said suspension is sheeted to form a water-laid web containing at least part of said pigment, the improvement which comprises adding to said suspension a small amount as retention aid of a polymer prepared by a process according to claim 1.

19. A process according to claim 18 wherein the pigment is titanium dioxide.

20. A process according to claim 18 wherein the pigment is calcium carbonate.

References Cited by the Examiner
UNITED STATES PATENTS

| | | | |
|---|---|---|---|
| 2,469,683 | 5/1949 | Dudley et al. | 260—2 |
| 2,844,490 | 7/1958 | Lehmann et al. | 260—29.2 |
| 2,849,411 | 8/1958 | Lehmann et al. | 260—29.2 |
| 3,031,505 | 4/1962 | Pollitzer | 260—2 |

MURRAY TILLMAN, *Primary Examiner.*

J. C. BLEUTGE, *Assistant Examiner.*